United States Patent [19]
Gillette

[11] Patent Number: 4,812,519
[45] Date of Patent: Mar. 14, 1989

[54] CROSSLINKING OF VINYL SILANE AND AZIDOSILANE MODIFIED THERMOPLASTIC POLYMERS BY MOISTURE

[75] Inventor: Paul C. Gillette, Wilmington, Del.

[73] Assignee: Hercules Incorporated, Wilmington, Del.

[21] Appl. No.: 108,526

[22] Filed: Oct. 15, 1987

[51] Int. Cl.$^4$ ................................................ C08F 8/00
[52] U.S. Cl. ...................... 525/106; 525/104; 525/100; 525/105; 525/101; 525/288; 525/398; 525/401; 525/410; 525/426; 525/431; 525/534
[58] Field of Search ............... 525/101, 104, 105, 106, 525/288, 398, 401, 410, 426, 431, 534, 100

[56] References Cited

U.S. PATENT DOCUMENTS

| | | | |
|---|---|---|---|
| 3,646,155 | 2/1972 | Scott | 260/827 |
| 3,697,551 | 10/1972 | Thomson | 260/349 |
| 4,032,592 | 6/1977 | Ogihara et al. | 260/827 |
| 4,247,667 | 1/1981 | Nojiri et al. | 525/254 |
| 4,413,066 | 11/1983 | Isaka et al. | 521/149 |
| 4,533,602 | 8/1985 | Nakamura et al. | 428/447 |
| 4,551,504 | 11/1985 | Barnabeo | 525/333.9 |
| 4,552,794 | 11/1985 | Goss | 428/95 |
| 4,591,606 | 5/1986 | Bergström | 521/79 |

Primary Examiner—Melvyn I. Marquis
Attorney, Agent, or Firm—Marion C. Staves

[57] ABSTRACT

The modification of thermoplastic polymers with a combination of azidosilanes and monolefinically unsaturated monomers and subsequent crosslinking by moisture.

13 Claims, No Drawings

CROSSLINKING OF VINYL SILANE AND AZIDOSILANE MODIFIED THERMOPLASTIC POLYMERS BY MOISTURE

FIELD OF INVENTION

This invention relates to water curable silane containing polymers wherein the silane group is introduced onto the polymer by reaction of the polymer with a combination of an azido silane and a monovalently olefinically unsaturated silicon compound. Such a combination provides for the use of less of the expensive azide compound without sacrificing physical property improvements of the polymer associated with the use of the azide compound alone.

BACKGROUND OF THE INVENTION

The crosslinking of polymers by various methods to achieve certain improved physical properties is well known in the art. The particular method of modifying polymers by azidosilanes and further crosslinking is known as for example in U.S. Pat. No. 3,697,551 to Thomson. Furthermore, the crosslinking of particular polymers such as polyethylene and polyethylenebutene copolymers after exposure to sulfonylazides and, subsequently, moisture is known as for example in U.S. Pat. No. 4,551,504 to Barnabeo. In addition, the subsequent moisture crosslinking of polymers previously exposed to a monovalently olefinically unsaturated silane and a peroxide have been disclosed as, for example, in U.S. Pat. No. 3,646,155 and U.S. Pat. No. 4,247,667.

Also, a method which describes polymers which have been modified with γ-methacryloxypropyltrimethoxysilane in the presence of peroxides has been disclosed in U.S. Pat. No. 4,032,592. And polyolefin blends which contain a polyolefin which has been modified with an olefinically unsaturated silane and a peroxide have been disclosed in U.S. Pat. No. 4,533,602.

Furthermore, polyethylenes which have been grafted with trimethoxyvinylsilane and a peroxide to give gel contents of about 23% to 78% and which are used to produce foams in the presence of 0.2 to 30 percent of a foaming agent such as azidocarbonamide based materials have been disclosed in U.S. Pat. No. 4,413,066. And polyolefin resins which are modified by trimethylvinylsilane with peroxide and are foamed by, and reacted with, water are disclosed in U.S. Pat. No. 4,591,606.

Also, polyolefin precoat compositions containing azidosilane crosslinking compounds have been described in U.S. Pat. No. 4,552,794.

SUMMARY OF THE INVENTION

Now, in accordance with this invention, it has been found that thermoplastic polymers such as polyolefins, even those which degrade upon exposure to peroxides such as polypropylene, and engineering thermoplastics can be modified with a combination of azidosilane and a monovalently olefinically unsaturated silicon compound and subsequently crosslinked with moisture. An engineering thermoplastic for purposes of this invention is a thermoplastic polymer which requires temperatures greater than about 170° C. to process. Because the monovalently olefinically unsaturated silicon compound can be used with the azidosilane, lower levels of the expensive azidosilane can be used than if azidosilane was used alone to achieve the same degree of physical property modification.

In this invention a thermoplastic polymer having a number average molecular weight greater than 20,000 is treated with a combination of an azidosilane of the formula (I):

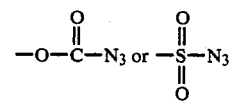

where R may be an organic radical, X may be selected from halo, alkoxy or aryloxy; T may be selected from alkyl, cycloalkyl, aryl, alkaryl, and aralkyl radicals; a is an integer from 1 to 3; b is an integer from 0 to 2; c is an integer from 1 to 10; d is an integer from 1 to 3, and a+b+d equals 4; and Z may be selected from $$-O-\overset{O}{\underset{\|}{C}}-N_3 \text{ or } -\overset{O}{\underset{\underset{O}{\|}}{\overset{\|}{S}}}-N_3$$

and a monovalently olefinically unsaturated silicon compound of of formula (II)

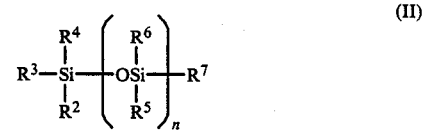

where n is an integer from 0 to 4 and where $R^2$, $R^3$, $R^4$, $R^5$, $R^6$, and $R^7$ are lower alkyl, monovalently olefinically unsaturated (alkenyl), aryl, aralkyl, or lower alkoxy and may be the same or different provided one is a monovalent olefinically unsaturated hydrocarbon radical. The resulting azidosilane and monovalently olefinically unsaturated vinyl silicon compound and polymer combination is then heated to a temperature to decompose the azide. Generally, this is in an apparatus with mechanical blending of the polymer such as in a Brabender mixer, Banbury mixer or an extruder. The reacted thermoplastic polymers are then crosslinked or cured by exposure to moisture to give a thermoset polymer. The crosslinking or curing may be carried out (1) by reaction with moisture in the atmosphere at room temperature, (2) by immersion in hot water or (3) by exposure to steam until about greater than ninety percent of the silane groups have been reacted with water.

DETAILED DESCRIPTION OF THE INVENTION

Azidosilanes useful in this invention are described by the azidosilanes of formula (I). In formula (I) R is generally selected from the group consisting of hydrocarbon, halo-substituted hydrocarbon, hydrocarbon-oxyhydrocarbon, hydrocarbon-thiocarbon, and hydrocarbonsulfonyl-hydrocarbon divalent radicals. In preferred embodiments R will be a divalent radical selected from the group consisting of alkylene radicals such as the straight chain and branched $C_1$ to $C_{20}$ alkenyl radicals which include, for instance, the methylene, ethylene, trimethylene, tetramethylene, pentamethylene, hexamethylene, octamethylene, decamethylene, dodecamethylene, octadecamthylene, and the like radicals; cycloalkylene radicals such as the $C_3$ to $C_{20}$ cycloalkylene radicals which include, for instance, the cyclohexylene, cyclopentylene, cyclooctylene, cyclobutylene, and the like radicals; arylene radicals suchas o-, m- and p-phenylene, naphthylene, biphenylene, and the like radicals; arylene-dialkylene radicals, such as o-, m- and p-xylylene diethylene, o-, m- and p-phenylene diethylene, and the like radicals; alkylene-diarylene radicals such as methylene bis (o-, m-, and p-phenylene), ethylene bis (o-, m-, and p-phenylene and the like radicals; cycloalkylenedialkylene radicals such as, 1,2-, 1,3- and 1,4-cyclohexanedimethylene, 1,2- and 1,3-cyclopentane dimethylene, and the like radicals; and the alkylene-oxy-alkylene radicals, arylene-oxy-arylene radicals, alkarylene-oxyarylene radicals, alkyarylene-oxyalkarylene radicals, aralkylene-oxyalkylene radicals, aralkylene-oxyoaralkylene radicals and the like as well as the corresponding thio and sulfonyl radicals, specific examples of which include ethylene-oxyethylene, propylene-oxybutylene, phenylene-oxyphenylene, methylenephenylene-oxy-phenylene-methylene, phenylene-methylene-oxymethylenephenylene, ethylene-thio-ethylene, phenylene-thio-phenyllene, phenylene-methylene-thiomethylene-phenylene, butylene-sulfonyl-butylene, and the like radicals. It will, of course, be obvious to those skilled in the art that R can contain other functional groups which are substantially inert to the reactions in which these compounds are used, such as esters, sulfonate esters, amides, sulfonamides, urethanes and the like. In general X can be a hydrolyzable radical. Typical hydrolyzable radicals are the halo radicals which include, for instance, the fluoro, chloro, bromo, and iodo, radicals; the alkoxy radicals including the $C_1$ to $C_{20}$ straight and branched chain alkoxy radicals such as methoxy, ethyoxy, propoxy, butoxy, isobutoxy, octadecyloxy and the like; the aryloxy radicals such as phenoxy, and the like; the organo oxycarbonyl radicals including the aliphatic oxycarbonyl radicals such as acetoxy, propionyloxy, stearoyl oxy, and the like; the cycloaliphatic oxycarbonyl radicals such as cyclohexyl-carbonyloxy, and the like; the aromatic oxycarbonyl radicals such as benxoyloxy, xylyloxy, and the like. Generally T will be a radical selected from the group consisting of alkyl, cycloalkyl, aryl, alkaryl, aralkyl radicals such as methyl, ethyl, propyl, isopropyl, butyl, hexyl, cyclohexyl, cycloheptyl, phenyl, tolyl, benxyl, xylyl, and the like. An especially preferred azidosilane for use in this invention is triethoxysilylhexane sulfonyl azide.

The monovalently olefinically unsaturated silicon compound useful in this invention are described as shown by the structure of formula (II). Examples of monovalently olefinically unsaturated hydrocarbon radicals are vinyl, allyl, butenyl, cyclohexenyl, cyclopentadienyl, cyclohexadienyl, methacryloxyalkl, acryloxyalkyl, and vinylphenoxy radicals. Examples of alkyl are methyl, ethyl, propyl, and the like radicals. Examples of alkoxy are methoxy, ethoxy, propoxy, and the like. Examples of aryl are phenyl and naphthyl. Examples of aralkyl are benzyl, ethylphenyl, and the like. An especially preferred vinyl silane useful in this invention is vinyltriethoxysilane.

Exemplary thermoplastic polymers which are useful in this invention are polyethylene, polypropylene, poly(4-methylpentene-1), polybutene-1, polystyrene, styrene-butadiene rubber, butyl rubber, natural rubber, polybutadiene, polyisobutylene ethylene-propylene copolymer, cis-1,4-polyisoprene, ethylene-propylene-dicyclopentadiene terpolymer and the like, and blends of these polymers with each other; bisphenol A polymers such as polysulfone; the polyamides such as nylon, Perlon®-L (nylon 6 polyamide), aromatic polyamides and the like; and poly(vinyl alkyl ethers) such as poly(vinyl methyl ether), polyoxymethylene and the like; vinyl chloride polymers such as poly(vinylchloride), vinyl chloride-vinyl acetate copolymers, vinylchloride-vinylidene chloride copolymers, vinylchloride-maleic anhydride copolymers, vinyl chloride-fumaric acid copolymers, vinyl chloride-vinyl acetal copolymers such as the vinyl chloride-vinyl butyral copolymers, vinyl chloride-vinylidene chloride-acrylonitile terpolymers, and the like. Especially useful polymers which are modified by this invention are ultra high molecular weight polyethylene (i.e., a polyethylene of number average molecular weight greater than about 500,000), polypropylene, polysulfone, and polyoxymethylene.

Polymer compositions of the azidosilane and monovalently olefinically unsaturated silicon compound can be achieved by directly treating the polymer powder or pellet with the azidosilane and monovalently olefinically unsaturated combination. Generally it is preferred to conduct the treatment with the azidosilane and monovalently olefinically unsaturated combination in solution or liquid form. Since some of the azidosilane and monovalently olefinically unsaturated combinations are solid, solvents are generally used. However, where the combination is liquid and especially where heating is involved, the polymer may be treated without the use of a solvent. The preferred solvents to use when solvents are necessary are low boiling organic solvents such as chloroform, methylene chloride, diethyl ether, tetrahydrofuran, and the like. Alternatively, the azidosilane and monovalently olefinically unsaturated silicon compound mixture can be blended into the polymer by initially treating a filler with a solvent solution of the azidosilane and monovalently olefinically unsaturated silicon compound combination and then mixing the filler with the polymer and subsequently heating. The filler may be any inorganic or organic material which is used in thermoplastic polymers. Especially useful fillers are mica, glass, talc, Wollasonite, asbestos, sand, clay, cement, stone, brick, and ceramic materials.

The amount of azidosilane and monovalently olefinically unsaturated silicon compound used will vary with the molecular weight of the polymer from about 0.1 to about 4 weight percent of each component. Generally, for polymers with a molecular weight greater than about 500,000, the preferred range of azidosilane is about 0.1 to 1.0 percent to about 0.1 to about 1 percent of the monovalently olefinically unsaturated silicon compound. When the polymer molecular weight is between about 20,000 and 500,000, the preferable amount of azidosilane is about 1 to about 2 weight percent and about 1 to about 2 weight percent of the monovalently olefinically unsaturated silicon compound. Generally it is preferred to use an equal amount of azidosilane to monovalently olefinically unsaturated silicon compound in the combination. However, it is possible to use differing amounts of azidosilane to monovalently olefinically unsaturated silane in the combination. Generally this range will be about 0.25 to 4 parts of azidosilane to about 1 part of monovalently olefinically unsaturated silicon compound.

Reaction of the azidosilane and monovalently olefinically unsaturated silicon compound with the polymer can be accomplished by heating the azidosilane and monovalently olefinically unsaturated silicon compound and polymer combination while mixing. This may be accomplished in a Brabender mixer, a Banbury mixer or an extruder. The temperature of heating will depend on the type of azide or polymer used. Generally, the temperature will be from about 120° C. to about 400° C. for a time sufficient to cause the reaction of at least 90 percent of the azidosilane and unsaturated silane reactive groups, i.e., azide and vinyl groups, in the combination.

It is generally believed that the thermal decomposition of azidosilanes of the type used in this invention form upon heating a triplet or singlet nitrene. If a singlet nitrene is formed, then presumably insertion of the silylnitrene into a C—C or preferably a C—H bond takes place as shown in equation (III). If, on the other hand, a triplet nitrene is formed, then hydrogen abstraction presumably initially takes place and the formed silylamine radical or an unsaturated silane can add to the formed polymer radical as shown in equation (IV). If the unsaturated silane adds to the radical as shown in equation (IV), polymerization of the monovalently olefinically silicon compound with other monovalently olefinically unsaturated silicon compound can proceed until chain termination occurs by a variety of mechanisms which can include coupling with the formed silylamine radical. If the monovalently olefinically unsaturated silicon compound is coupled to the azidosilane through —Si—O—Si— bonds before heating, then chemical crosslinking can occur. The mechanisms of equations (III) and (IV) are not meant to limit the invention but merely to provide a description of the type of reaction which occurs while carrying out the invention.

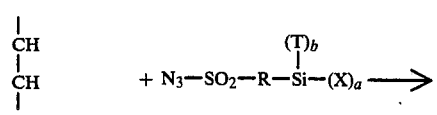

Segment of Polymer Chain (III)

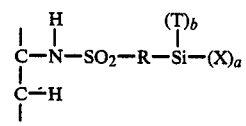

C—H Bond Insertion of Singlet Nitrene

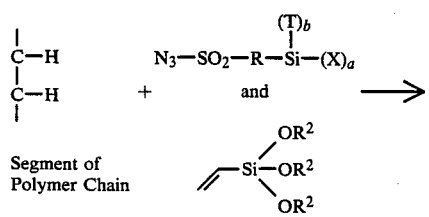

Segment of Polymer Chain (IV)

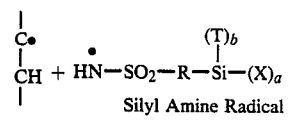

Silyl Amine Radical

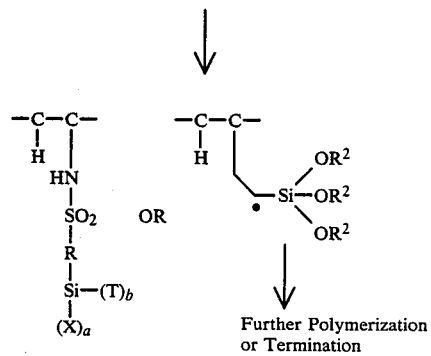

Further Polymerization or Termination

The moisture curing or crosslinking of the azidosilane and monovalently olefinically unsaturated silicon compound modified polymer is effected by exposing the polymer to moisture. This can be accomplished in a number of ways. The polymer may be exposed to the moisture in the air. Or it may be immersed in heated water. Or it may be exposed to steam. The rate of reaction will depend on the temperature, the thickness of the sample and the transmission rate of moisture in the polymer. Thus, the time of exposure to moisture to convert the thermoplastic material to a thermoset material will depend on these factors, (1) temperature of reaction with moisture, (2) thickness of sample and (3) type of polymer and its molecular weight. In the preferred embodiment of this invention, it is desirable to expose the formed polymer whether it be a fiber, or film or shaped article to steam at about a temperature of 70° C. to 120° C. until about 90 percent of the silyl groups have been reacted with water to form the particularly desired —Si—O—Si— bonds.

In the following examples, which are illustrative of the present invention, triethoxysilylhexane sulfonylazide was used in combination with triethoxyvinylsilane. The triethoxysilylhexane sulfonylazide was prepared by hydrosilation of hexene with trichlorosilane, followed by sulfochlorination, followed by ethoxylation, and finally reaction with sodium azide. This procedure is given in detail in Example 1. The vinyl triethoxysilane was used as received from Petrach Systems. Insoluble gel means the amount of polymer which does not dissolve in a particular solvent at its boiling point after 24 hours. The percent gel is determined by weighing the dried "gel" and comparing that amount to the weight of the starting sample.

EXAMPLE 1

(A) Preparation of Triethoxysilylhexane Sulfonylazide 1-hexene (38 g, 1 eq) is added dropwise to a stirred, refluxing (35° C.) mixture of trichlorosilane (67 g) and dichlorobis (benzonitrile) platinum II (0.00337 g). The heat source is removed and the temperature continues to rise during the addition, reaching 65° C. After the addition is complete and the temperature drops to 50° C., a vacuum of 15 mm is applied for thirty minutes. The product is a water white liquid of 83.6 g of trichlorosilylhexane. Gas chromatographic analysis shows it to be 95% pure.

The trichlorosilylhexane (80 g) in methylene chloride (640 g) is added to a pyrex reaction flask and it is sparged with nitrogen for 15 minutes and cooled to 5°–10° C. The reaction mixture is saturated with sulfur dioxide and a 125 watt Hanovia mercury lamp placed as close to the flask as possible is turned on. Sulfur dioxide and chlorine gas in a 1:2 ratio are bubbled in until about 1 equivalent of sulfur dioxide and chlorine are added. A nitrogen purge is bubbled into the reaction mixture for 15 minutes with the light on. The solvent and sulfuryl chloride are distilled off at about 15 mm and at a pot temperature of 70° C., then distilled at about 1 mm. The unreacted trichlorosilylhexane is distilled off at about 1 mm and 70°–90° C.

Trichlorosilylhexane sulfonyl chloride (32 g) are added to methylene chloride (100 g) in a reaction flask fitted with a stirrer and condenser and heated to reflux under a nitrogen purge. When at reflux, dry ethanol (14 g, 3.1 equivalents) is added dropwise and the mixture is stirred and refluxed under nitrogen for one hour. After cooling to room temperature, the water condenser is replaced with a dry ice condenser, propylene oxide (6 g, 1 equivalent) is added and the mixture and stirred at room temperature for thirty minutes. The mixture is evaporated at 50° C. under water aspirator vacuum to give 34 g of triethoxysilylhexane sulfonyl chloride.

Sodium azide (1.5 equivalent) in 4 ml of sodium hydrogen phosphate and hydrogen chloride buffer (14.4 g or Na$_2$HPO$_4$ to 4.4 mil conc HCl in 1 liter of distilled water) per gram of azide is added dropwise to a stirred 50 percent solution of triethoxysilylhexane sulfonyl chloride in methylene chloride containing 1 percent Aliquat 336. The mixture is stirred at room temperature for thirty minutes after the addition is complete. The layers are separated. The methylene chloride layer is washed with a saturated salt solution, dried over magnesium sulfate and the methylene chloride is evaporated. Ninety percent solids of a light yellow liquid triethoxysilylhexane sulfonyl azide of about 90 percent purity are obtained.

(B) Preparation of Modified Polymer

A mixture of 1.0 weight percent of triethoxysilylhexane sulfonyl azide and 1.0 weight percent triethoxyvinylsilane is mixed with high density polyethylene of number average molecular weight of about 150,000 for five minutes in a Waring blender. The samples are then masticated using a Brabender Plastograph for five minutes at 200° C. under a nitrogen blanket and are subsequently compression molded into 6"×6"×25 mil plaques at 240° C. using an Elmes press. The resulting plaques are then steamed for 24 hours in a pressure cooker at about thirty psi. Insoluble gel determinations are made by refluxing 1 gram of sample in 200 ml of decalin for 24 hours. The percent gel of this sample was 95%.

EXAMPLE 2

A mixture of 2 weight percent of triethoxysilylhexane sulfonyl azide and 1 weight percent of triethoxyvinylsilane is mixed with Pro-fax ® 6501 polypropylene of number average molecular weight of about 50,000 for five minutes in a Waring blender. The sample is then masticated by a Brabender Plastograph for five minutes at 200° C. under a blanket of nitrogen and subsequently compression molded into 6"×6"×25 mil plaques at 240° C. using an Elmes press. The resulting plaques are then steamed for 26 hours at about 120° C. followed by overnight drying in a steam heated oven. Insoluble gel determination are made by refluxing 1 gram of sample in 200 ml of xylene for 24 hours. Percent gel of this sample was 63 percent.

EXAMPLE 3

A mixture of 0.5 weight percent of triethoxysilylhexane sulfonylazide and 0.5 weight percent of triethoxyvinylsilane is mixed with ultrahigh molecular weight polyethylene of number average molecular weight of 500,000 or greater for five minutes in a Waring blender. The sample is then extruded at about 240° C. The resulting strands are then steamed for 24 hours in a pressure cooker at about 30 psi. Insoluble gel determination is made by refluxing 1 gram of sample in 200 ml of decalin for 24 hours. Percent gel of this sample is 90 percent.

EXAMPLE 4

A mixture of 1.5 weight percent of triethoxysilylhexane sulfonylazide and 1.5 weight percent of triethoxyvinylsilane is mixed with Udel ® polysulfone of number average molecular weight of about 50,000 for five minutes in a Waring blender. The sample is subsequently extruded at about 350° C. and the resulting strands are then steamed for 24 hours at about 120° C. followed by overnight drying in a steam oven. Insoluble gel determination is made by refluxing 1 gram of sample in 200 ml of xylene for 24 hours. Percent gel of this sample is 75 percent.

EXAMPLE 5

A mixture of two weight percent of triethoxysilylhexane sulfonyl azide and two weight percent of triethoxyvinylsilane is mixed with polyoxymethylene of number average molecular weight of about 50,000 for five minutes in a Waring blender. The sample is then extruded at about 400° C. and the resulting strands are steamed for 24 hours at about 120° C. followed by overnight drying in a steam heated oven. Insoluble gel determinations are made by refluxing 1 gram of sample in 200 ml oc xylene for 24 hours. The percent gel of this sample is 95 percent.

What is claimed is:

1. A polymer composition comprising (i) a thermoplastic polymer of number average molecular weight of 20,000 or greater, (ii) from about 0.1 to about 4 weight percent of an azidosilane having the formula

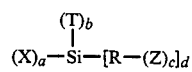

where R is an organic radical; X is a radical selected from the group consisting of halo, alkoxy, aryloxy, aliphatic oxycarbonyl, cycloaliphatic oxycarbonyl, and aromatic oxycarbonyl radicals; T is a radical selected from the group consisting of alkyl, cycloalkyl, aryl, alkaryl, and aralkyl radicals; a is an integer from 1 to 3; b is an integer from 0 to 2; c is an integer from 1 to 10; d is an integer from 1 to 3; a+b+d equals 4; and Z is selected from

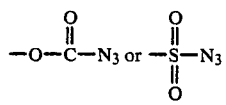

and (iii) from about 0.1 to about 4 weight percent of an olefinically unsaturated silicon compound having the formula

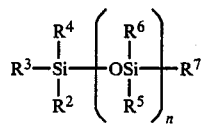

where n is an integer from 0 to 4; one of $R^2$, $R^3$, $R^4$, $R^5$, $R^6$, and $R^7$ is an alkenyl radical and the other $R^2$, $R^3$, $R^4$, $R^5$, $R^6$, and $R^7$ radicals are selected from the group consisting of lower alkyl, aryl, aralkyl and lower alkoxy radicals.

2. The thermoplastic polymer composition of claim 1 wherein the thermoplastic polymer is a polyolefin having a number average molecular weight of 500,000 or greater, said azidosilane is present in an amount of from about 0.1 to about 1 weight percent and said olefinically unsaturated silane is present in an amount of from about 0.1 to about 1 weight percent.

3. The thermoplastic polymer composition of claim 1 wherein the thermoplastic polymer is a polyolefin having a number average molecular weight of from about 20,000 to about 500,000, said azidosilane is present in an amount of from about 1 to about 2 weight percent and said olefinically unsaturated silane is present in an amount of from about 1 to about 2 weight percent.

4. The polyolefin polymer composition of claim 3 wherein the polyolefin is polypropylene.

5. The thermoplastic polymer of claim 3 wherein said thermoplastic polymer has been modified by thermal reaction with triethoxysilylhexane sulfonylazide and vinyltriethoxysilane at a temperature to decompose the azide.

6. The thermoplastic polymer composition of claim 1 wherein the thermoplastic polymer is an engineering thermoplastic having a number average molecular weight of about 20,000 to 500,000, said azidosilane is present in an amount of from about 1 to about 2 weight percent and said olefinically unsaturated silane is present in an amount of from about 1 to about 2 weight percent.

7. The composition of claim 6 wherein the engineering thermoplastic is polysulfone.

8. The composition of claim 6 wherein the engineering thermoplastic in polyoxymethylene.

9. The thermoplastic polymer of claim 6 wherein said thermoplastic polymer has been modified by thermal reaction with triethoxysilylhexane sulfonylazide and vinyltriethoxysilane at a temperature to decompose the azide.

10. The thermoplastic polymer of claim 1 wherein said thermoplastic polymer has been modified by thermal reaction with triethoxysilylhexane sulfonylazide and vinyltriethoxysilane at a temperature to decompose the azide.

11. The process for carrying out the crosslinking of a thermoplastic polymer which comprises the steps of (i) modifying a thermoplastic polymer by heating with from about 0.1 to about 4 weight percent of an azidosilane having the formula

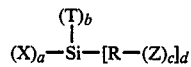

where R is an organic radical; X is a radical selected from the group consisting of halo, alkoxy, aryloxy, aliphatic oxycarbonyl, cycloaliphatic oxycarbonyl, and aromatic oxycarbonyl radicals; T is a radical selected from the group consisting of alkyl, cycloalkyl, aryl, alkaryl, and aralkyl radicals; a is an integer from 1 to 3; b is an integer from 0 to 2; c is an integer from 1 to 10; d is an integer from 1 to 3; a+b+d equals 4; and Z is selected from

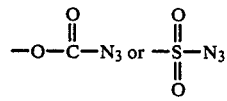

and from about 0.1 to about 4 weight percent of an olefinically unsaturated silicon compound having the formula

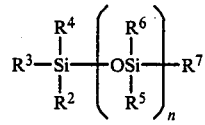

where n is an integer from 0 to 4; one of $R^2$, $R^3$, $R^4$, $R^5$, $R^6$, and $R^7$ is an alkenyl radical and the other $R^2$, $R^3$, $R^4$, $R^5$, $R^6$, and $R^7$ radicals are selected from the group consisting of lower alkyl, aryl, aralkyl and lower alkoxy radicals; at an elevated temperature to decompose the azide and (ii) exposing the modified product to moisture.

12. The crosslinked thermoplastic polymer prepared by the process of claim 11 wherein the thermoplastic polymer is selected from the group consisting of polypropylene, polyethylene having a number average molecular weight greater than about 500,000, polysulfone, and polyoxymethylene.

13. The crosslinked thermoplastic polymer prepared by the process of claim 11 wherein said thermoplastic polymer with a combination of an azidosilane and an olefinically unsaturated silane is heated at an elevated temperature for a time to react about 90 percent of the reactive groups and subsequently exposing said reacted polymer to moisture until about 90 percent of the silane groups are reacted.

* * * * *